United States Patent [19]

Drisko

[11] 4,445,329

[45] May 1, 1984

[54] FULL TORQUE TRANSMISSION CONTROL

[76] Inventor: Benjamin B. Drisko, P.O. Box 717, Camden, Me. 04843

[21] Appl. No.: 359,047

[22] Filed: Mar. 17, 1982

Related U.S. Application Data

[63] Continuation-in-part of Ser. No. 148,163, May 8, 1980, abandoned.

[51] Int. Cl.³ ............................................. F16H 39/46
[52] U.S. Cl. ....................................... 60/431; 60/448; 74/861; 74/865; 180/170; 180/307
[58] Field of Search .......................... 60/395, 431, 448; 74/861, 862, 865, 856; 180/170, 307; 91/381

[56] References Cited

U.S. PATENT DOCUMENTS

| | | | |
|---|---|---|---|
| 2,008,231 | 7/1935 | Vincent | 74/336.5 |
| 2,599,387 | 6/1952 | Hefel | 74/865 |
| 3,031,848 | 5/1962 | Kane et al. | 60/395 |
| 3,628,042 | 12/1971 | Jacobus | 60/395 |
| 3,927,528 | 12/1975 | van der Kolk et al. | 74/865 |
| 3,943,713 | 3/1976 | Walton | 60/395 |
| 4,023,641 | 5/1977 | Ganoung | 180/307 |
| 4,091,690 | 5/1978 | Miyao | 74/865 |
| 4,191,270 | 3/1980 | Monteith | 60/395 |

Primary Examiner—George L. Walton

Attorney, Agent, or Firm—W. R. Hulbert

[57] ABSTRACT

There is disclosed a throttle control means connected to the throttle which in response to operator input puts the throttle in one of two positions, the first fully open and the second an idle position, a transmission control system including desired speed input means responsive to operator input producing a signal indicative of the drive wheel speed desired by the operator, actual speed means connected to the drive wheels for generating a signal proportional to the road speed of the vehicle, comparing means connected to the desired speed and actual speed means and to the transmission for comparing the desired speed means and the actual speed means and, responsive to results from such comparing, generating a control signal changing the output-to-input speed ratio of the transmission. The transmission control system is arranged and connected to be effective, when the throttle control means puts the throttle in full open position, to increase the output-to-input speed ratio of the transmission whenever the drive wheel speed is more than the indicated desired speed and to reduce the output-to-input speed ratio of the transmission whenever the drive wheel speed is less than the indicated desired speed.

2 Claims, 2 Drawing Figures

FULL TORQUE TRANSMISSION CONTROL

CROSS-REFERENCES TO RELATED APPLICATIONS

This is a continuation-in-part of application Ser. No. 148,163 filed May 8, 1980, now abandoned.

BACKGROUND OF THE INVENTION

This invention relates to improving the efficiency of internal combustion engines, particularly those used in motor vehicles.

Through most of the useful range of speeds of a motor vehicle maximum fuel efficiency would be achieved if the engine could be operated at full throttle. An internal combustion engine is essentially a constant torque device. Widely varying road conditions make the combination of a constant torque and constant speed a most unwelcome combination for good efficiency. The best the industry has been able to do so far is to provide the engine with the highest usable torque and vary the gear ratio from the engine to the drive wheels to accommodate the vehicle to changes in load called for by the varying roadway.

With an internal combustion engine (IC engine) the piston and cylinder walls and the like are alternately exposed to widely differing temperatures from as high as 2000 to 3000 degrees F. to exhaust temperatures of about 1000 degrees, or desirably less. Since the change in temperature is related to the engine speed (RPMs), it is clear that the thermal effects become worse at low speeds than at high speeds. This can only result in loss of fuel efficiency at low speeds. The case of automobiles is further obfuscated by the fact that gasoline and diesel fuels require different treatment.

It is possible in the present state of the art economically to provide a servo mechanism fuel control loop which seeks to optimize fuel efficiency with varying speed and varying road conditions. Hence one must contrive two variable displacement pumps, one for gasoline that varies the fuel-air ratio, and the other that varies the charge injected into the cylinder of a Diesel engine—two quite different problems.

In the past the varying solutions proposed to these problems have been obscured by the fact that the optimum fuel charge for best efficiency depends not only upon the compression but upon the temperature, the velocity (swirling), the humidity, the cylinder wall and/or piston head temperature and other fine structure effects too numerous to mention. Prior workers have attempted to include as many of these effects as possible, but have never quite succeeded.

The present invention proposes a much simpler approach to the solution of the problems just enumerated, and, properly engineered, should yield improvement in fuel economy by a factor of at least two over the nearest competition, and perhaps much more.

SUMMARY OF THE INVENTION

According to the invention, I provide in a motor vehicle driven by an internal combustion engine and having a continuously variable gear ratio transmission coupling the engine to the drive wheels the improvement permitting the engine to run at full throttle throughout most of the useful range of vehicle speeds. The invention is used in conjunction with a motor vehicle having an internal combustion engine with a throttle, a transmission with a variable output-to-input speed ratio, and drive wheels coupled to the engine through such transmission, and features a throttle control means connected to the throttle which in response to operator input puts the throttle in one of two positions, the first fully open and the second an idle position, a transmission control system including desired speed input means responsive to operator input producing a signal indicative of the drive wheel speed desired by the operator, actual speed means connected to the drive wheels for generating a signal proportional to the road speed of the vehicle, comparing means connected to the desired speed and actual speed means and to the transmission for comparing the desired speed means and the actual speed means and, responsive to results from such comparing, generating a control signal changing the output-to-input speed ratio of the transmission. The transmission control system is arranged and connected to be effective, when the throttle control means puts the throttle in full open position, to increase the output-to-input speed ratio of the transmission whenever the drive wheel speed is more than the indicated desired speed and to reduce the output-to-input speed ratio of the transmission whenever the drive wheel speed is less than the indicated desired speed.

The invention may additionally feature a variable speed motor with an output shaft rotating at a speed controlled by an operator, a shaft coupled to the drive wheels and rotating at a speed proportional to the speed of the drive wheels, a differential gear with the motor output shaft and the shaft coupled to the drive wheels connected as inputs, and a differential output shaft, connected to increase the output-to-input speed ratio of the transmission where the rotation of the shaft coupled to the drive wheels is faster than the rotation of the motor output shaft.

DETAILED DESCRIPTION OF PREFERRED EMBODIMENT

Figure 1:
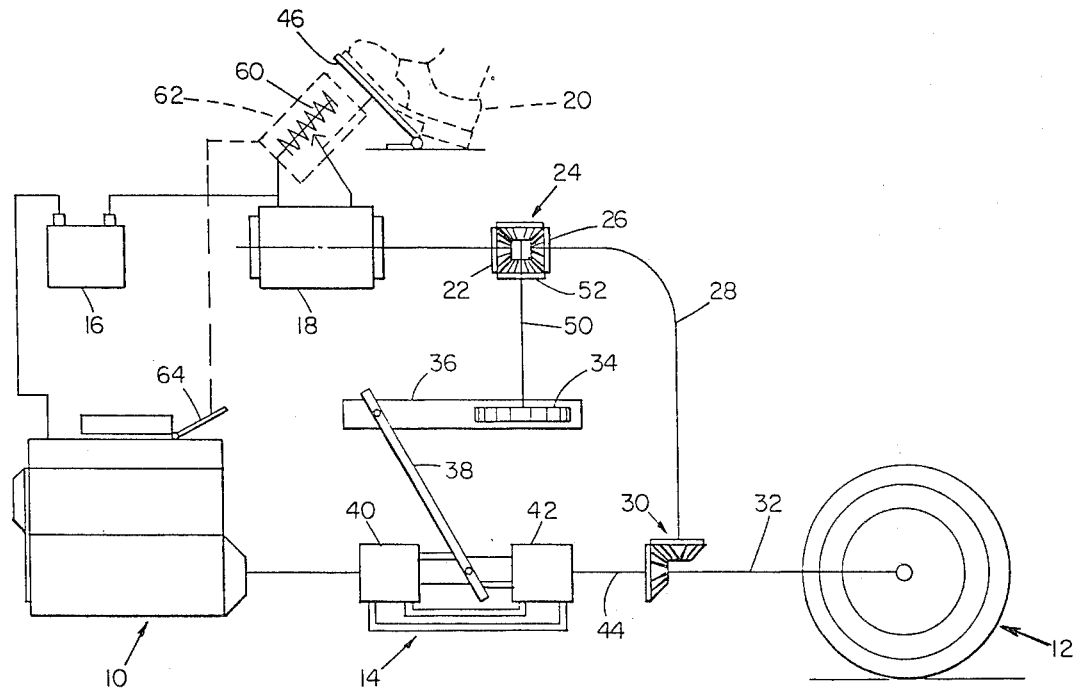
FIG. 1 shows in a schematic representation the drive train and controls of a vehicle using the invention.

The drawing shows schematically the essential components of an automobile to illustrate the invention. Engine 10, which may be gasoline or diesel, drives wheels 12 through continuously variable transmission 14 and drive differential (not shown). Storage battery 16 supplies whatever electric power is needed. A DC electric motor 18 has its speed (RPM) under the control of the pedal 46, controlled by the driver 20 and drives one of the gears 22 of differential 24 whose other input gear 26 is driven by speedometer cable or other suitable flexible shaft 28 which is, in turn, driven by gears 30 associated with the drive shaft 32.

Output pinion 34 driven by output gear 52 and shaft 50 of differential 24 drives rack 36 which in turn shifts the gear shift lever 38 of the continuously variable transmission 14. The coupling is such that when gear 26 connected to drive shaft 32 is rotating faster than gear 22 connected to motor 18, rack 36 is moved to increase the output-to-input speed ratio of transmission 14. The transmission 14 may be of any suitable type. The drawing indicates a hydrostatic transmission having pump 40 and motor 42, both of which are variable displacement in type and have a range of about 4.5 giving a total speed range of over 20.1 for control purposes of output drive shaft 44 of the engine.

When the driver depresses the pedal 46 the RPM of motor 18 increases, thereby driving the input gear 22 at higher RPM. After a brief period of acceleration of the vehicle the RPM of gear 22 is presumed proportional to vehicle speed. At the same time the input gear 26 is driven at vehicle speed by the rotation of shaft 32.

Figure 2:
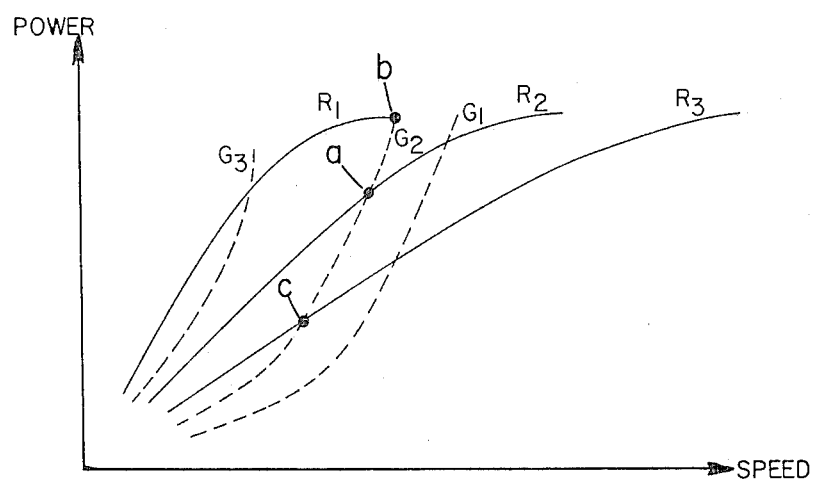
FIG. 2 shows certain relationships between speed and power useful in explaining the operation of the invention.

The operation of the invention can be further explained with reference to FIG. 2, which shows the relationship between power and speed for an internal combustion engine at full throttle and various gear ratios, in one set of curves, and the relationship of the power required to move the vehicle at steady speed at various grades in another set of curves. The speed referred to in the plot of FIG. 2 is the speed of rotation of the speed of the shaft at the output of the transmission which is directly proportional to the speed of the wheels. The curves describing the power output of the engine are marked $R_1$, $R_2$, and $R_3$, representing the power output of the engine plotted against speed for three different and progressively higher output-to-input speed ratios of the transmission. The shape of the R curves reflects the general operating characteristics of the internal combustion engine, which develops constant torque over a considerable operation range independently of its speed with the developed torque falling off as the engine approaches its maximum power. Since the developed power is the product of the torque and speed, the R curves in FIG. 2 are proportional to speed at lower speeds and then flatten out at maximum power. The curves marked $G_1$, $G_2$, and $G_3$ show the power required to move the vehicle at three progressively higher grades. In general the power to move a vehicle increases with the speed and somewhat more steeply at higher speeds. At higher grades the power needed is greater at any given speed. Suppose initially a vehicle equipped according to the invention is operating in a condition corresponding to point a in FIG. 2. In this condition the drive train is in equilibrium since the power developed by the engine is equal to that required to move the vehicle at steady speed. Moreover, the equilibrium is stable since, as can be seen from the figure, any casual increase in the vehicle speed will move the operating condition to the right on the plot where the power requirements exceed the supply so the speed will be returned to the original operating condition.

Suppose the vehicle to be operating at point a. Gear 22 and gear 26 are rotating at the same speed and gear 52 and shaft 50 are still. If the operator now wishes to drive at a higher speed he advances pedal 46 to a position corresponding to the greater speed. This will cause moter 18 to speed up and gear 22 to rotate faster than gear 26. Gear 52 and shaft 50 will accordingly rotate, and pinion 34 will drive transmission control in the direction to reduce the output-to-input speed ratio of transmission 14, and the applicable power curve will be shifted to curve $R_1$. In this condition the power developed by the engine will exceed the power required by the vehicle for constant speed, and the vehicle will accelerate. After a transient period a new equlibrium will be established at point b. In an analogous manner, if from point a the operator wished to go slower, he would move the control so as to shift the transmission to a higher speed ratio, resulting in less power being developed by the engine than required for continuing at the original speed. The vehicle would accordingly slow down and come to a new stable operating condition at point c. It may be particularly noted that both in steady driving and in shifting speed the throttle of the engine remains fully open so that the engine at all times operates at maximum fuel efficiency. If the vehicle encounters an upgrade and tends to slow down, shaft 28 will correspondingly revolve more slowly and the net output of the differential 24 will be to shift lever 38 in the direction to provide a lower output-to-input speed ratio between engine and drive wheels.

In order to permit the engine to idle when the vehicle is in neutral or coasting and to operate at full throttle when power is desired from the engine, there may be provided a suitable control system responsive to the position of pedal 46. Such system 60 is indicated schematically. Switch 62 will open the throttle 64 wide when the pedal is depressed but only after the vehicle has achieved a predetermined threshold speed at a lower setting, and will close the throttle to idle position whenever the pedal is fully released.

Further economies in fuel consumption may be effected by a mixture control which is in the nature of a second or higher order control which operates on the fuel-air ratio. For some time, like several years, it has been known that additional economies can be effected by changes in the fuel-air ratio as the pressure, speed, water vapor, etc., are changed. This adjustment may take one or the other of two forms depending on whether the engine in question has a carburetor or whether it operates by fuel injecton, as in a diesel. Either engine already has a speed/power control already for ordinary driving use, the throttle of the gasoline engine or the injector stroke of the fuel injection principle of the diesel and some gasoline driven cars. The servo loop we are now discussing is in the nature of a vernier or small adjustment which the engine may do to itself automatically without any action on the part of the driver of the vehicle or any other person. This may require a small computer to generate the right size and frequency of pulses or other impetus to actuate the device as above.

Since the primary or differential servo operates in such fashion as to always choose the maximum power for the given road load and speed at the moment, it becomes easily understandable that the vernier or second order correction servo which takes the shape of a fuel-air ratio adjustment has only to achieve a secondary maximum to solve its problem. It does this by measuring the intensity of the last explosion and compares it to the previous one. It then adjusts the fuel-air ratio a very small amount in the direction of whichever one was the greater. After a series of explosions, this will quickly approach the situation where the size chooses alternates between the optimum and the next best, first on one side and then on the other. This difference has previously been chosen by the designer to be such a near negligible difference that for all practical purposes it is zero. Actually, of course, it is maybe two times the smallest amount that can be felt but not measured. It is the sensitivity of the scale but not its accuracy.

While there has been shown and described a presently preferred embodiment of the invention, it will be evident to those skilled in the art that the same is capable of being carried out in a wide variety of other embodiments. In place of the motor and rheostate type controls 18 and 60 any suitable means for generating a signal proportional to the movement of the pedal 46 may be employed, provided that the signal may be made compatible for comparison with the signal generated by the RPM of the drive wheels of the vehicle so as to generate a resulting signal representing the difference between the two signals. Likewise, the continuously variable transmission can take any number of forms and may be controlled by any suitable means, mechanical, electrical or hydraulic in lieu of the lever system 38 shown in the drawing.

It will therefore be understood that it is intended that the scope of the invention be limited only by the broadest permissible intepretation which may be afforded the appended claims.

I claim:

1. In a motor vehicle having an internal combustion engine with a throttle, a transmission with a variable output-to-input speed ratio, and drive wheels coupled to the engine through such transmission, the improvement comprising
   a throttle control means connected to said throttle which puts said throttle in one of two positions, the first fully open and the second an idle position,
   a throttle and transmission control system including
      desired vehicle speed input means responsive to operator input producing a one time selected signal indicative of the drive wheel speed desired by the operator,
      actual vehicle speed means connected to said drive wheels for generating a signal proportional to the drive wheel speed of the vehicle,
      comparing means connected to said desired vehicle speed and actual vehicle speed means and to said transmission for comparing said desired speed means and said actual speed means and, responsive to results from such comparing, generating a control signal changing the output-to-input speed ratio of said transmission, said throttle control means being controlled automatically by the engine, and
   said transmission control system being arranged and connected to be effective independently of the one-time selected signal, when said throttle control means puts said throttle in full open position, to increase the output-to-input speed ratio of said transmission reducing the engine power output whenever said drive wheel speed is more than the indicated desired vehicle speed and to reduce the output-to-input speed ratio of said transmission increasing the engine power output whenever the drive wheel speed is less than the indicated desired speed.

2. Apparatus as claimed in claim 1 wherein
   said desired vehicle speed input means includes a variable speed motor with an output shaft rotating at a speed controlled by an operator,
   said actual vehicle speed means including a shaft coupled to said drive wheels and rotating at a speed proportional to the speed of said drive wheels, and
   said comparing means includes a differential gear with said motor output shaft and said shaft coupled to the drive wheels connected as inputs, and a differential output shaft connected to increase the output-to-input speed ratio of said transmission where the rotation of said shaft coupled to the drive wheels is faster than the rotation of said motor output shaft.

* * * * *